United States Patent [19]

Baugh

[11] Patent Number: 5,165,493
[45] Date of Patent: Nov. 24, 1992

[54] MUD SAVER VALVE

[76] Inventor: Benton F. Baugh, 14626 Oak Bend, Houston, Tex. 77079

[21] Appl. No.: 697,987

[22] Filed: May 10, 1991

[51] Int. Cl.$^5$ ............................................. E21B 21/10
[52] U.S. Cl. .............................. 175/218; 137/512.15; 137/853; 137/906; 166/321; 175/317; 175/324; 251/5
[58] Field of Search ........................ 175/218, 317, 324; 166/326, 321; 137/512.15, 853, 906; 251/5

[56] References Cited

U.S. PATENT DOCUMENTS

| | | | |
|---|---|---|---|
| 3,331,385 | 7/1967 | Taylor | 137/515 X |
| 3,566,964 | 3/1971 | Livington | 137/515 X |
| 3,698,411 | 10/1972 | Garrett | 137/536 X |
| 3,698,426 | 10/1972 | Litchfield | 137/496 X |
| 3,738,436 | 6/1973 | Litchfield et al. | 175/218 X |
| 3,965,980 | 6/1976 | Williamson | 137/496 X |
| 3,967,680 | 7/1976 | Jeter | 166/325 X |
| 4,056,965 | 11/1977 | Heiser | 251/5 X |
| 4,128,108 | 12/1978 | Parker et al. | 137/493.9 X |
| 4,303,100 | 12/1981 | Kalb | 175/218 X |
| 4,313,462 | 2/1982 | Adamson | 137/512.1 |
| 4,779,688 | 10/1988 | Baugh | 175/218 |
| 4,899,837 | 2/1990 | Baugh | 175/218 |
| 4,962,819 | 10/1990 | Bailey et al. | 175/218 |
| 4,969,513 | 11/1990 | Barrus et al. | 251/5 X |

OTHER PUBLICATIONS

An advertising sheet showing "Beta Mud Saver Valve" published by Radsil Tool Company, Inc., 1990.

Primary Examiner—Hoang C. Dang

[57] ABSTRACT

A mud saver valve in which a cylindrical resilient sleeve is pressed against an inner tubular member by a pressurized gas to prevent flow from above the valve to below the valve at low pressures, and which is fully opened for free flow at higher pressures.

7 Claims, 2 Drawing Sheets

MUD SAVER VALVE

BACKGROUND OF THE INVENTION

The field of invention of this valve pertains to valves and more particularly to a valve assembly of the type known as a kelly foot valve or a mud saver valve used in the rotary system for drilling oil wells.

Conventional drilling of oil wells uses a drill string or sections of drill pipe to pump drilling mud down to a drilling bit at the bottom of the hole being drilled. The drill string also typically is rotated to provide rotary power to the drilling bit at the bottom of the hole. As the hole is progressively drilled deeper and deeper, sections of drill pipe are added to the drill string to allow continued drilling. These sections are typically 30 feet long. The drill string is supported in the rotary table of the rig and the upper drive section or kelly is unscrewed. When it is unscrewed, the mud in the kelly and the hose connecting the top of the kelly to the other piping on the rig pours out onto the rig floor.

The pouring of the drilling mud onto the rig floor is expensive because of the cost of the mud and is dangerous to the rig crew as it makes the floor slippery.

Prior art valves have been inserted into the drill string at the foot or lower end of the kelly with different characteristics and with different degrees of success. One solution has been to place a slim outside diameter ball valve in the string. The ball valve is manually operated by the drilling crew.

Other valves have been added which operate automatically based upon bore pressure or upon throttling of the fluid across the valve. These valves are typically installed in a sub called the kelly saver. The term kelly saver comes from the fact that the section of square pipe at the top of the drill pipe which is engaged by the rotary table to turn the drill pipe is called the kelly. Each time 30 feet more of the well is drilled, the connection at the bottom of the kelly is unscrewed and a joint of drill pipe is added to allow further drilling. This causes high wear and reduced life on the relatively expensive kelly. A short inexpensive section of pipe is normally added to the bottom of the kelly to take this wear and is typically called a kelly saver.

A typical problem with most prior art valves is that the valves characteristically do not allow the bore thru the valve to be opened for service access down into the string of drill pipe and then to be put back into regular service without having to disassemble the mud saver valve from the drill string. Some of the alternatives, i.e. U.S. Pat. No. 3,698,411 and U.S. Pat. No. 3,965,980 require breaking a cap portion at the top of the valve to allow such service. U.S. Pat. No. 4,128,108 discloses a mud saver valve which requires that a pin be sheared to allow such service. U.S. Pat. No. 3,331,385 discloses a valve in which an extra part is added with special running tools to allow opening and then plugging the bore. This provides the limitations of making the hole available for servicing smaller, adding extra parts, and not allowing the critical wear surfaces to be retrieved easily for inspection and/or replacement.

A second problem exists with prior art valves is that the flow passages thru the valve are reduced in area, causing accelerated flow velocities. The higher velocities promote wear and reduced service lives of the valves.

SUMMARY OF THE INVENTION

The object of this invention is to provide a mud saver valve assembly which prevents flow of drilling mud out of a kelly portion of a drill string when the pressure in the kelly is below a predetermined level, and which allows full and free flow of mud out of the kelly when the pressure in the kelly is above a predetermined level.

A second object is to provide a method which allows the flow area thru the mud saver valve to exceed the flow area thru the drill string, allowing reduced velocity flow, and therefore extended wear and service life.

A third object is to allow flow in the opposite direction to allow for pressure monitoring of pressure below the mud saver valve by a gage above the mud saver valve.

Another object of the invention is to provide an independent means of flow thru the valve in case the primary means becomes obstructed or otherwise blocked preventing flow.

DESCRIPTION OF THE PREFERRED EMBODIMENT

Figure 1:
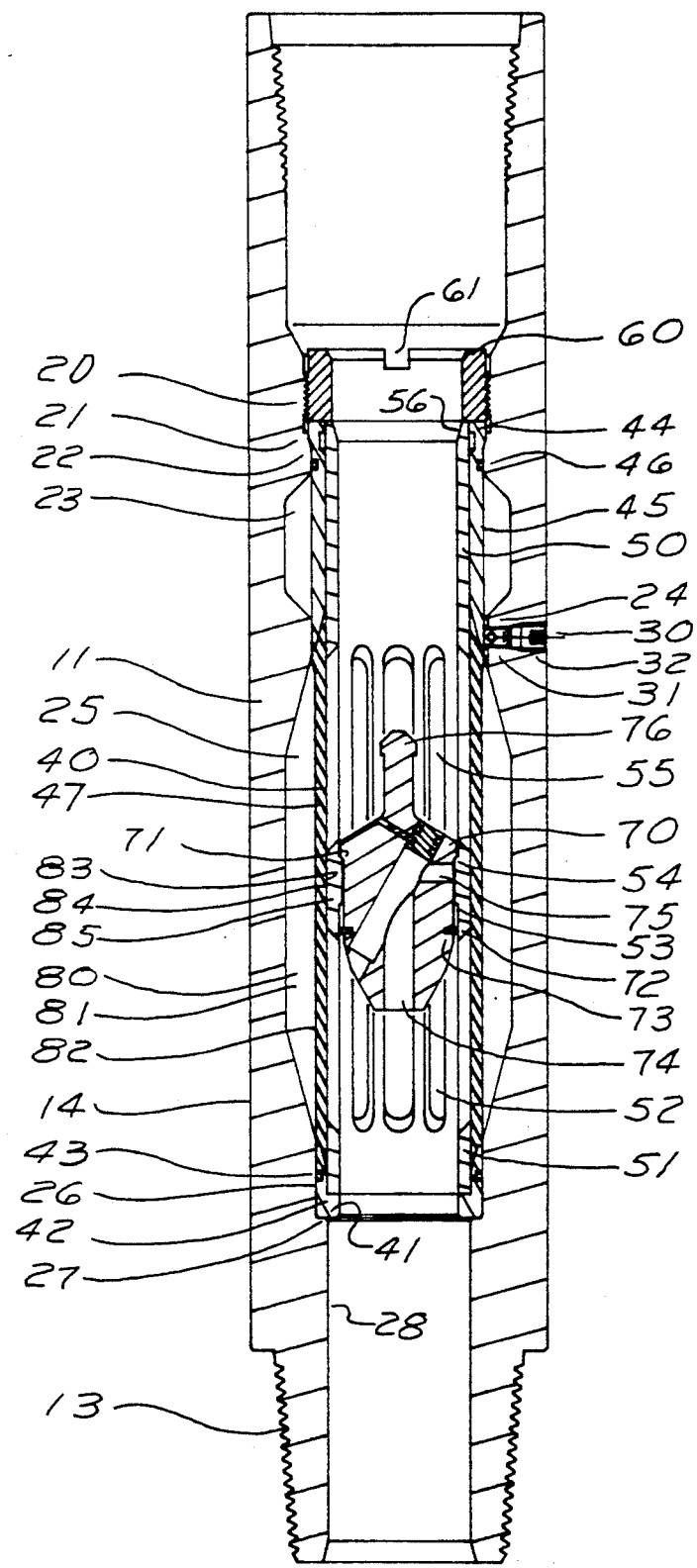
FIG. 1 is a half section of the valve in the closed position as it would be without flow and without flow thru the valve.

Referring now to FIG. 1, the mud saver valve 10 has a main body 11 which includes an upper female tool joint thread 12, a lower male tool joint thread 13, and a central body portion 14. The upper female tool joint thread 12 will connect to the bottom of the Kelly portion of the drill string. Lower male tool joint thread will be attached to and support the drill string down to the drilling bit.

In the bore of the main body 11 below the upper female tool joint thread 12 are an attachment thread 20, shoulder 21, seal bore 22, upper annular recess 23, passage 24, lower annular recess 25, seal bore 26, shoulder 27, and thru bore 28. Generally in the area of the passage 24 is a nitrogen filling port 30, including a check valve means 31 and a sealing plug 32.

Sealing sleeve 40 is inserted into the bore of main body 11 until the lower shoulder 41 of metal ring 42 hits the shoulder 27. O-Ring 43 is provided to sealingly engage the seal bore 26. Shoulder 44 of metal ring 45 lands on shoulder 21 to position metal ring 45. O-Ring 46 is provided on metal ring 45 to sealingly engage seal bore 22. Between metal ring 45 and metal ring 42 is resilient element 47. Resilient element 47 is bonded on each end to the respective metal rings.

Cage ring 50 is provided to fit within the sealing sleeve 40 with shoulder 51 landing on a mating shoulder on the metal ring 42. Cage ring 50 provides lower circulation slots 52, lower shoulder 53, upper shoulder 54, upper circulation slots 55, and upper shoulder 56.

Threaded ring 60 engages attachment thread 20 to hold the sealing sleeve 40 and the cage ring 50 snuggly down in position. Threaded ring 60 has castellations 61 on the top side for engagement by a wrench or flat bar for screwing it into place and for unscrewing it.

Dart 70 lands on upper shoulder 54 with its mating shoulder 71. This contact between shoulders acts as a sealing surface to prevent the flow of drilling mud downwardly past this interface. Snap ring 72 is provided in groove 73 which prevents dart 70 from moving up further than approximately ½". This slight upward movement allows for monitoring of pressure below the mud saver valve without the danger of the dart 70 being pumped up into the kelly. Pressure from below flows up thru passage 74, thru passage 75 and up past the dart 70. A fishing neck profile 76 is provided to allow the dart 70 to be completely removed and allow service operations to be conducted thru the bore of the mud saver valve and the drill string.

Gas 80, usually nitrogen, is stored under pressure within the cavity 81 generally defined by lower annular recess 25, upper annular recess 23, and the outer surface 82 of resilient element 47. The pressure of the gas 80 presses the inner surface 83 of the resilient element 47 against the outer surface 84 of the central portion 85 of cage ring 50. The contact pressure between inner surface 83 and outer surface 84 prevents the flow of drilling mud from within the kelly above the mud valve 10 to the drill string below the mud valve.

When the pumps are stopped in drilling operations and the mud saver valve is unscrewed from the drill string below, the pressure generated by the column of drilling mud above the mud saver valve is generally proportionate to the height of the column of drilling mud and the density of the drilling mud. The height of the column varies from approximately 45 to 60 feet. The density of the mud normally varies from 8½ to 18 lbs./cubic feet. The design pressure for such systems is typically about 75 p.s.i. This means that a typical mud saver valve is designed to seal against a pressure of 75 p.s.i., and will allow pressures greater than that to pass. The construction of conventional mud saver valves is such that the 75 p.s.i. is a set pressure, and cannot be easily varied.

The present invention controls the pressure to be sealed by the mud saver valve by the pressure of the gas 80 outside the resilient element 50. A gas pressure of approximately 75 p.s.i. will seal against a column of mud of approximately 75 p.s.i. A port 30 is provided with check valve 31 and sealing plug 32. Nitrogen gas can be pumped into the cavity 81 thru port 30 to increase the gas pressure and enable the mud saver valve to seal higher drilling mud pressures. Nitrogen gas can be vented from the cavity 81 thru port 30 to decrease the gas pressure and enable the mud saver valve to allow drilling mud flow at lower pressures.

Figure 2:
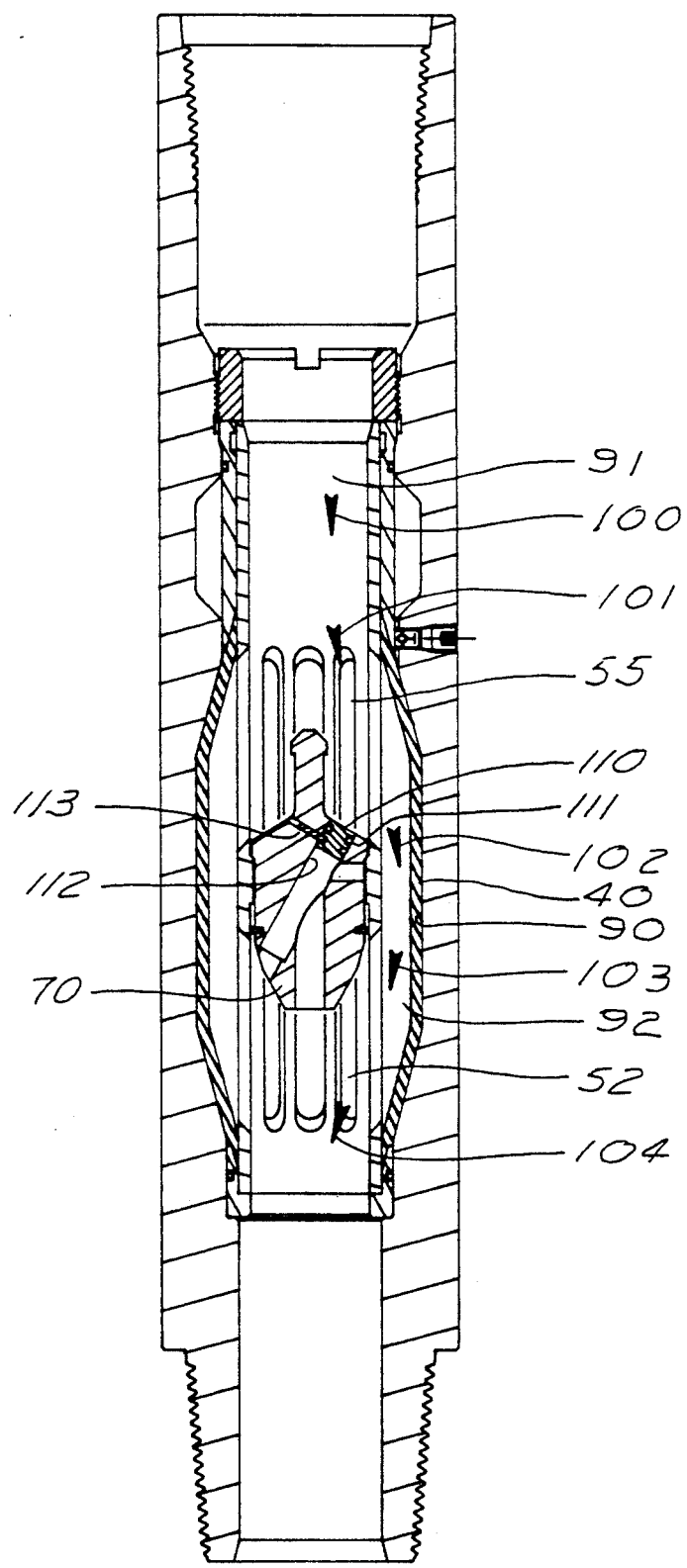
FIG. 2 is a half section of the valve in the fully opened position as would occur when the bore is pressure above a predetermined level.

Referring not to FIG. 2, when the pressure within the bore exceeds the pressure of the gas 80, the resilient element 40 begins to expand. At a higher pressure, i.e. 300 p.s.i., the resilient element will be fully expanded against the wall 90 of the cavity 25. The gas 80 is compressed into the cavity 23. Further increases in drilling mud pressure will more tightly compress the resilient element 40 against the wall 90 of cavity 25, but will not increase the pressure of the gas 80 now within cavity 23.

Thru bore 28 reflects the normal restriction thru the threaded tool joint connections of a drill string. The cross sectional area of upper bore 91, upper circulation slots 55, annular area 92, and lower circulation slots 52 can all be made to exceed the cross sectional area of thru bore 28. In the normal construction, each of the areas would be designed to exceed the cross sectional area of the thru bore by at least 50 percent. This increase in area slows the velocity of the drilling fluids, yielding an inherently longer life of the mud save valve. Conventional mud saver valves have the flow area thru the valve parts restricted, yielding high velocities and high erosion rates. The relatively unrestricted flow path thru the valve of the present invention is illustrated by the arrows 100-104.

Plug 110 is sealed by O-Ring 111 in bore 112 and is retained in place by shear pin 113. When the pressure differential from above the dart 70 to below the dart exceeds a maximum desired, i.e. 500 p.s.i., shear pin 113 will fail. This allows plug 110 to move down the bore 112, thereby allowing mud flow to pass thru the central portion of the dart 70. This will provide for required temporary circulation in case of catastrophic failure of the resilient element 47 that blocks the lower circulation slots 52.

The foregoing disclosure and description of this invention are illustrative and explanatory thereof, and various changes in the size, shape, and materials as well as the details of the illustrated construction may be made without departing from the spirit of the invention.

I claim:

1. A mud saver valve for retaining drilling fluid in the kelly of a drilling rig, comprising:
    an outer cylindrical body having a threaded connection at the upper end, a threaded connection at the lower end, and a central annular area;
    an inner resilient means, said inner resilient means being in sealing engagement with said outer cylindrical body proximate its upper end and proximate it lower end,
    a first cavity between said central annular area and said inner resilient means,
    a second cavity within said mud saver valve in communications with said first cavity,
    a cage member having a lower ported area, a central unported area, an upper ported area, an upwardly facing shoulder, and a downwardly facing shoulder,
    a dart member landed on said upwardly facing shoulder,
    a gas pressurized to a first pressure within said first and said second cavities urging said inner resilient means into sealing engagement with said central unported area of said cage member such that drilling fluid in said kelly at pressures below said first pressure will be prevented from flowing from above said dart, thru said upper ported area, past said central unported area, thru said lower ported area, and to the area below said dart,
    an such that drilling fluid is said kelly at pressures above said first pressure will be allowed to flow from above said dart, thru said upper ported area, past said central unported area, thru said lower ported area, and to the area below said dart,
    further providing porting means communicating with said first cavity and said second cavity from outside said mud saver valve,
    further providing a plug within said dart opened if the differential pressure from above said dart to below said dart exceeds a predetermined maximum,
    further providing that said dart is free to move up a predetermined distance allowing some fluid flow from below said dart to above said dart, and
    further providing a fishing neck on said dart.

2. A mud saver valve for retaining drilling fluid in the kelly of a drilling rig, comprising:
    an outer cylindrical body having a central annular area, a threaded connection at the lower end and a threaded connection at the upper end;

an inner resilient means;

a cavity between said central annular area and said inner resilient means;

a cage member having an unported section within said inner resilient means for said inner resilient seal means to engage for sealing, upper porting thru said cage member above said unported section and lower porting thru said cage member below said unported section to allow fluid flow to come from said kelly, thru said upper porting, past said unported section, thru said lower period section, and down into the drill string below said mud saver valve, and further that said cage member has a bore therethrough and an upward facing shoulder in said bore;

dart means to land on said upward facing shoulder in the bore of said cage member to close the bore within said cage member against flow from above said dart to below said dart; and gas pressurized to a first pressure within said cavity urging said inner resilient sealing means into sealing engagement with said cage member, such that drilling fluid will be retained within the kelly above said mud saver valve when the drilling fluid pressure does not exceed said first pressure and further such that when the drilling fluid pressure exceeds said first pressure in said gas, said inner resilient means expands to allow fluid to pass through the annular area between said inner resilient means and said unported section of said cage member.

3. The invention of claim 2, wherein a downwardly facing shoulder is provided on said cage member and a retaining means is provided on said dart to limit the upward travel of said dart due to flow reversals from the bottom to the top of said mud valve.

4. The invention of claim 2, wherein a sealing means is provided to allow flow from above said dart means to below said dart means thru an alternate path in the event that the pressure differential from the area above said dart to the area below said dart exceeds a predetermined maximum.

5. The invention of claim 4, wherein said sealing means is a piston within a bore.

6. The invention of claim 5, wherein a shear pin is allowed to shear and release said piston for movement when said pressure differential from above said dart means to below said dart means exceeds said predetermined maximum.

7. The invention of claim 3, wherein said dart has a fishing neck on its upper end.

* * * * *